US009690299B2

(12) United States Patent
Movert et al.

(10) Patent No.: US 9,690,299 B2
(45) Date of Patent: Jun. 27, 2017

(54) METHOD AND SYSTEM FOR CONTROLLING A FLYING WING

(71) Applicant: Minesto AB, Västra Frölunda (SE)

(72) Inventors: Anders Movert, Västra Frölunda (SE); Per Hillerborg, Hisings Kärra (SE)

(73) Assignee: MINESTO AB, Västra Frölunda (SE)

(*) Notice: Subject to any disclaimer, the term of this patent is extended or adjusted under 35 U.S.C. 154(b) by 50 days.

(21) Appl. No.: 14/651,597

(22) PCT Filed: Apr. 10, 2013

(86) PCT No.: PCT/SE2013/050387
§ 371 (c)(1),
(2) Date: Jun. 11, 2015

(87) PCT Pub. No.: WO2014/092625
PCT Pub. Date: Jun. 19, 2014

(65) Prior Publication Data
US 2015/0316931 A1    Nov. 5, 2015

(30) Foreign Application Priority Data

Dec. 13, 2012  (SE) .................. PCT/SE2012/051389

(51) Int. Cl.
G05D 1/08        (2006.01)
G05D 1/02        (2006.01)
(Continued)

(52) U.S. Cl.
CPC .......... *G05D 1/0866* (2013.01); *B64C 39/022* (2013.01); *F03B 17/06* (2013.01);
(Continued)

(58) Field of Classification Search
CPC ...... G05D 1/0866; B64C 39/022; F03D 5/005
(Continued)

(56) References Cited

U.S. PATENT DOCUMENTS 6,185,470 B1      2/2001   Pado et al.
2004/0128096 A1   7/2004   Luo
2007/0228738 A1  10/2007   Wrage et al.

FOREIGN PATENT DOCUMENTS

EP   1816345 A1   8/2007
EP   2631468 A1   8/2013
(Continued)

OTHER PUBLICATIONS

International Preliminary Report on Patentability received for PCT Patent Application No. PCT/SE2013/050387, mailed on Jun. 25, 2015, 8 pages.
(Continued)

*Primary Examiner* — Mussa A Shaawat
*Assistant Examiner* — Nadeem Odeh
(74) *Attorney, Agent, or Firm* — Morrison & Foerster LLP

(57) ABSTRACT

The invention relates to a method for control of a flying wing. The flying wing is arranged to be controlled to move along a predetermined trajectory by means of a fluid stream passing a wing of the flying wing. The flying wing comprises at least one control surface for controlling the movement of the flying wing along the predetermined trajectory. The flying wing is positioned in a reference frame where the x-axis is directed horizontally along a level L above which the flying wing moves, the y-axis is perpendicular to the x-axis in a vertical direction and the z-axis is perpendicular to the x-axis along the level L in a direction along the principal direction of the fluid stream. The invention further relates to a system comprising a flying wing and a computer-readable medium for use with a flying wing.

13 Claims, 4 Drawing Sheets

(51) Int. Cl.
  *B64C 39/02* (2006.01)
  *F03B 17/06* (2006.01)
  *F03D 5/00* (2006.01)
  *F03D 9/25* (2016.01)

(52) U.S. Cl.
  CPC ............... *F03D 5/00* (2013.01); *F03D 5/005* (2013.01); *F03D 9/25* (2016.05); *G05D 1/0202* (2013.01); *F05B 2210/16* (2013.01); *F05B 2240/917* (2013.01); *F05B 2240/97* (2013.01); *Y02E 10/28* (2013.01); *Y02E 10/38* (2013.01); *Y02E 10/70* (2013.01); *Y02E 10/728* (2013.01)

(58) Field of Classification Search
  USPC .............................................. 701/5; 244/154
  See application file for complete search history.

(56) References Cited

FOREIGN PATENT DOCUMENTS

| WO | 2007/135701 A2 | 11/2007 |
| WO | 2009/126988 A1 | 10/2009 |

OTHER PUBLICATIONS

International Written Opinion received for PCT Patent Application No. PCT/SE2013/050387, mailed on Feb. 10, 2014, 6 pages.
Extended European Search Report received for European Patent Application No. 13861581.0, mailed on Jul. 13, 2016, 8 pages.
Napolitano et al. "A Fault Tolerant Flight Control System for Sensor and Actuator Failures using Neural Networks", Aircraft Design, vol. 3, No. 2, Jan. 1, 2000, pp. 103-128.
International Search Report received for PCT Patent Application No. PCT/SE2013/050387, mailed on Feb. 10, 2014, 4 pages.

METHOD AND SYSTEM FOR CONTROLLING A FLYING WING

CROSS REFERENCE TO RELATED APPLICATIONS

This application is a U.S. National Stage patent application of PCT/SE2013/050387, filed on Apr. 10, 2013, which claims priority to International Patent Application No. PCT/SE2012/051389, filed on Dec. 13, 2012, the entire contents of which are incorporated herein by reference.

FIELD OF THE INVENTION

The invention relates to a method for control of a flying wing. The wing is arranged to be controlled to move along a predetermined trajectory by means of a fluid stream passing the wing. The wing comprises at least one control surface for controlling the movement of the flying wing along the predetermined trajectory. The flying wing is positioned in a reference frame where the x-axis is directed horizontally along a level above which the flying wing moves, the y-axis is perpendicular to the x-axis in a vertical direction and the z-axis is perpendicular to the x-axis along said level in a direction along the principal direction of the fluid stream. The invention further relates to a system comprising a flying wing and a computer-readable medium for use with a flying wing.

BACKGROUND OF THE INVENTION

Flying wings are known in the art. The control of a flying wing uses a number of control surfaces to control the movement of the flying wing. The control surfaces depend on input from various sensors which provide information on various parameters needed to control the flying wing.

Today's solutions may involve many mechanical and electrical systems as well as sensors exposed to high loads. All this leads to limited robustness of the flying wing and involves high cost in the form of for instance lower reliability, greater complexity of the flying wing to achieve desired control properties, decreased time before serviceability is exceeded and increased development times.

One application used today for flying wings is the production of energy from a fluid stream by letting the flying wing be attached to a tether and allowing the energy of the fluid stream be converted to electrical energy by any suitable means. Measuring and controlling the flying wing's position indirectly from for instance tether angles relative to a surface is an imprecise method. The sensors used may exhibit a level of noise which when used to control the control surfaces causes mechanical fatigue due to unnecessary movement of the control surfaces. Traditional solutions such as Kalman filters cannot remove all the noise from sensors. Sensors may additionally experience wear from being exposed to the fluid stream.

There thus exists a need for an improved method for controlling a flying wing.

SUMMARY OF THE INVENTION

One object of the present invention is to provide an inventive method for control of a flying wing where the previously mentioned problems are partly avoided. Another object of the present invention is to provide a system comprising a flying wing comprising at least one control surface for controlling the movement of the flying wing along a predetermined trajectory. The invention further provides a computer-readable medium for use with a flying wing having computer executable instructions for performing the method.

The invention relates to a method for control of a flying wing. The wing is arranged to be controlled to move along a predetermined trajectory by means of a fluid stream passing the wing. The flying wing comprises at least one control surface for controlling the movement of the flying wing along the predetermined trajectory. The flying wing is positioned in a reference frame where the x-axis is directed horizontally along a level above which the flying wing moves, the y-axis is perpendicular to the x-axis in a vertical direction and the z-axis is perpendicular to the x-axis along said level in a direction along the principal direction of the fluid stream. The control of the flying wing is arranged to be performed using as control parameters a horizontal position of the flying wing, a vertical position of the flying wing, the heading of the flying wing and the yaw rate of the flying wing. The horizontal position, the vertical position, the heading and the yaw rate can be measured and/or modelled. The method uses as measured input values heading, pressure to obtain measured vertical position, yaw rate and speed of the flying wing. The method comprises controlling the movement of the flying wing along the predetermined trajectory during a sensor feedback phase using measured values of heading, vertical position and yaw rate and modelled values of horizontal position, switching between said sensor feedback phase and a model feedback phase after a predetermined distance along the predetermined trajectory has been traversed and when a deviation between a measured value of the vertical position and a modelled value of the vertical position is below a threshold value, controlling the movement of the flying wing along the predetermined trajectory during said model feedback phase using modelled values of heading, vertical position, horizontal position and yaw rate.

One object of the invention is to remove as many unnecessary parts and sensors as possible while still being able to maintain control of the flying wing, thus providing a more robust flying wing. A further object is to remove sensor noise feedback into the rudder servo by not using sensor input in model feedback phase for controlling the flying wing, thereby improving energy generation, decreasing service cost and reducing the risk of catastrophic failure of the flying wing. This is achieved in that the method only uses the above mentioned input values thereby reducing the number of sensors needed. Further, by using a model feedback phase the sensor feedback is replaced by model feedback effectively reducing the noise from the remaining sensors as no sensor inputs are fed directly to the control system of the flying wing. The method allows positioning of the flying wing in the optimal horizontal position, aligning the flying wing to the direction of the sea current.

The method initially uses measured input values for control but after a predetermined distance along the predetermined trajectory has been traversed and when a deviation between a measured value of the vertical position and a modelled value of the vertical position is below a threshold value the method switches to using modelled values for feedback. This reduces the sensor noise that impacts the control surface movements.

To be able to control the flying wing, one needs the horizontal and vertical position of the flying wing, the heading of the flying wing and the yaw rate of the flying wing.

In the initial phase, measured values of vertical position and yaw rate are used to ensure a stable start. After a period of time during which the models are adapted, the models are used for direct feedback instead of the sensors. Adaption of the models is still done after switching to model feedback.

An advantage with the invention is that the method makes it possible to control the flying wing with few and reliable parts. As the only input signals needed to control the flying wing are heading, pressure, yaw rate and speed any additional sensors previously used may be excluded. This reduces the complexity of the flying wing while still allowing the flying wing to be controlled with accuracy. By removing a number of sensors the risk of the flying wing breaking down is reduced. Further, by using sensors that are robust low noise sensors the impact of the noise on the control surfaces of the flying wing is reduced. Noisy control signals directed to the control surfaces would otherwise propagate to the control surfaces causing the moving parts of the control surfaces to wear out prematurely. This is completely reduced during the model feedback phase of the method. Additional advantages include an increased efficiency in control as previously unnecessary movements from the control surfaces that slow the flying wing down are reduced. Lower cost due to fewer sensors and decreased service costs and optimal horizontal position of the flying wing without the use of extra sensors are also advantageous. The invention describes two different methods for obtaining vertical and horizontal positions used in the sensor feedback phase and the model feedback phase as described below.

The sensor method uses sensors to estimate position and heading angle. The signal from the yaw rate sensor may be integrated to find out the heading angle. As an initial value for the heading angle the g-vector estimated from the accelerometer may be used. The vertical position (in the form of a vertical Cartesian position or elevation angle) can be estimated using pressure sensors. The initial horizontal position (in the form of a horizontal Cartesian position or azimuth angle) must be estimated since it is not measured. Once the vertical and/or horizontal position is located it can be updated by integrating the speed of the flying wing in the relevant direction.

A second approach to find out the position of the flying wing is to do an online simulation without using the sensors directly into the controllers, a model feedback phase. The only exception is the speed estimation of the flying wing. The difference from the sensor method is that the vertical position is also updated as the horizontal position and that the yaw rate sensor is replaced with a model of the yaw rate. The advantage by using this approach is that all sensor noise can be left out which results in less noise being sent to the control surfaces. Less use of the control surface noise increases the power generation and will prolong the lifetime of the control surface systems.

In order to improve the position and heading angle estimation, the model needs feedback from measurements. This is achieved by something which is referred to as adaptation. The pressure sensor will for example give information on how the flying wing turns, how much the trajectory shape is tilted and how fast the flying wing is dragged towards a point downstream to the structure. The speed of the flying wing will indicate that there is more available power in some direction. This information is used to improve the control by tuning the model. This adaption is essential for the second approach (model feedback phase) since it requires good models of the actual dynamics.

The sensor feedback phase of the method may comprise:
Continuously calculating the heading by integrating the measured yaw rate
Iteratively adapting the heading based on the measured vertical position after a predetermined distance along the predetermined trajectory has been traversed
Iteratively adapting the yaw rate based on the measured vertical position after a predetermined distance along the predetermined trajectory has been traversed
Calculating a modelled adaptation of the yaw rate in order to prepare for the transition between the sensor feedback phase and the model feedback phase
Calculating the flying wing's modelled horizontal position and modelled vertical position are calculated by dead reckoning using the measured speed and measured heading of the flying wing
Iteratively adapting the modelled horizontal position of the flying wing based on the average speed a first part of the predetermined trajectory and the average speed of a second part of the predetermined trajectory
Iteratively adapting a horizontal drift speed based on the average speed a first part of the predetermined trajectory and the average speed of a second part of the predetermined trajectory
Iteratively adapting the modelled vertical position based on the difference between the modelled vertical position and the measured vertical position
Iteratively adapting a vertical drift speed based on the difference between the modelled vertical position and the measured vertical position.

The measured values are adapted at a regular interval, i.e. after a predetermined distance along the predetermined trajectory has been traversed. This is to compensate for deviations from the predetermined trajectory caused by for instance a change in direction of the fluid stream or another external influence. The adaptations may also compensate for sensor offsets or other errors arising from the sensors which cause the flying wing to deviate from the desired predetermined trajectory.

The model feedback phase of the method may comprise:
Continuously calculating the modelled heading by integrating the modelled yaw rate
iteratively adapting the modelled heading based on the difference between the measured vertical average position and the modelled vertical average position after a predetermined distance along the predetermined trajectory has been traversed
Iteratively adapting the modelled yaw rate based on the difference between the measured vertical position and the modelled vertical position after a predetermined distance along the predetermined trajectory has been traversed
Calculating the flying wing's modelled horizontal position and modelled vertical position are calculated by dead reckoning using the measured speed and measured heading of the flying wing
Iteratively adapting the modelled horizontal position of the flying wing based on the average speed a first part of the predetermined trajectory and the average speed of a second part of the predetermined trajectory
Iteratively adapting a horizontal drift speed based on the average speed a first part of the predetermined trajectory and the average speed of a second part of the predetermined trajectory Iteratively adapting the modelled vertical position based on the difference between the modelled vertical position and the measured vertical position Iteratively adapting a vertical drift speed based on the difference between the modelled vertical position and the measured vertical position.

The modelled values are adapted at a regular interval, i.e. after a predetermined distance along the predetermined trajectory has been traversed. The updates are done between every 1-20 laps, specifically between every 2-10 laps, more specifically every three laps to compensate for deviations from the predetermined trajectory caused by for instance a change in direction of the fluid stream or another external influence. In stable conditions the updates may be done even less often than every 20 laps.

The heading may be obtained from a heading sensor, the pressure may be obtained from a pressure sensor, the yaw rate may be obtained from a yaw rate sensor and the speed may be obtained from a speed sensor. It is advantageous to use sensors which are robust and which produce low noise sensor inputs as these are used during the sensor feedback phase.

The flying wing may be arranged to be attached to said level by means of a tether attached to a structure positioned at said level. When attached to a tether the flying wing can be assumed to move along a spherical surface with a radius equal to the distance from the flying wing to a structure to which the tether is attached. The tether may be used for connecting and supporting the flying wing to a structure which is fixed or secured in an essentially fixed position in a fluid stream or at a location comprising a fluid stream, wherein the direction of the fluid stream may, or at least occasionally do, change or alternate its direction.

The flying wing may comprise a turbine for generating electrical energy. The energy is generated by the movement of the flying wing through the fluid causing a rotor of the turbine to rotate. The energy is transported through the tether to an energy distribution network. The method allows for positioning the flying wing to the best horizontal position for power generation, aligning the flying wing to the direction of the fluid current. By adapting the horizontal position, the flying wing finds the optimal position for power production without the use of extra sensors needed to for instance measure sea current direction or horizontal flying wing position. The flying wing may be submerged.

The invention further relates to a system comprising a flying wing comprising a wing and at least one control surface for controlling the movement of the flying wing along a predetermined trajectory. The flying wing is arranged to move along the predetermined trajectory by means of a fluid stream passing the wing. The flying wing is positioned in a reference frame where the x-axis is directed horizontally along a level above which the flying wing moves, the y-axis is perpendicular to the x-axis in a vertical direction and the z-axis is perpendicular to the x-axis along said level in a direction along the principal direction of the fluid stream. The system uses measured values of a yaw rate, a heading and a vertical position and a modelled value of a horizontal position during an sensor feedback phase of movement along the predetermined trajectory, and modelled values of yaw rate, vertical position, horizontal position and heading during a model feedback phase of movement along the predetermined trajectory for control of the flying wing. The system uses as measured input values heading, pressure to obtain measured vertical position, yaw rate and speed of the flying wing.

The system may further comprise a level pressure sensor located at the level over which the flying wing moves for measuring the level pressure at said level, the level pressure being used to improve the calculation of the vertical position of the flying wing over the level to which it is attached.

The flying wing of the system may be arranged to be attached to said level by means of a tether attached to a structure positioned at said level.

In the system, the heading may be obtained from a heading sensor, the pressure may be obtained from a pressure sensor, the yaw rate may be obtained from a yaw rate sensor and the speed may be obtained from a speed sensor.

In the system, the heading sensor may be an accelerometer, the yaw rate sensor may be a gyroscope, the pressure sensor may measure a wing fluid pressure at a surface of the flying wing and be of any suitable type and the speed sensor may comprise one of at least a turbine, a current meter or a pressure based speed sensor. As stated above it is important that the sensors are robust and as noiseless as possible.

In the system, the flying wing may comprise a turbine for generating electrical energy by the movement of the flying wing through the fluid. The flying wing may be submerged.

The invention further relates to a computer-readable medium for use with a flying wing having computer executable instructions for performing the method as described above.

DETAILED DESCRIPTION OF THE INVENTION

Figure 1:
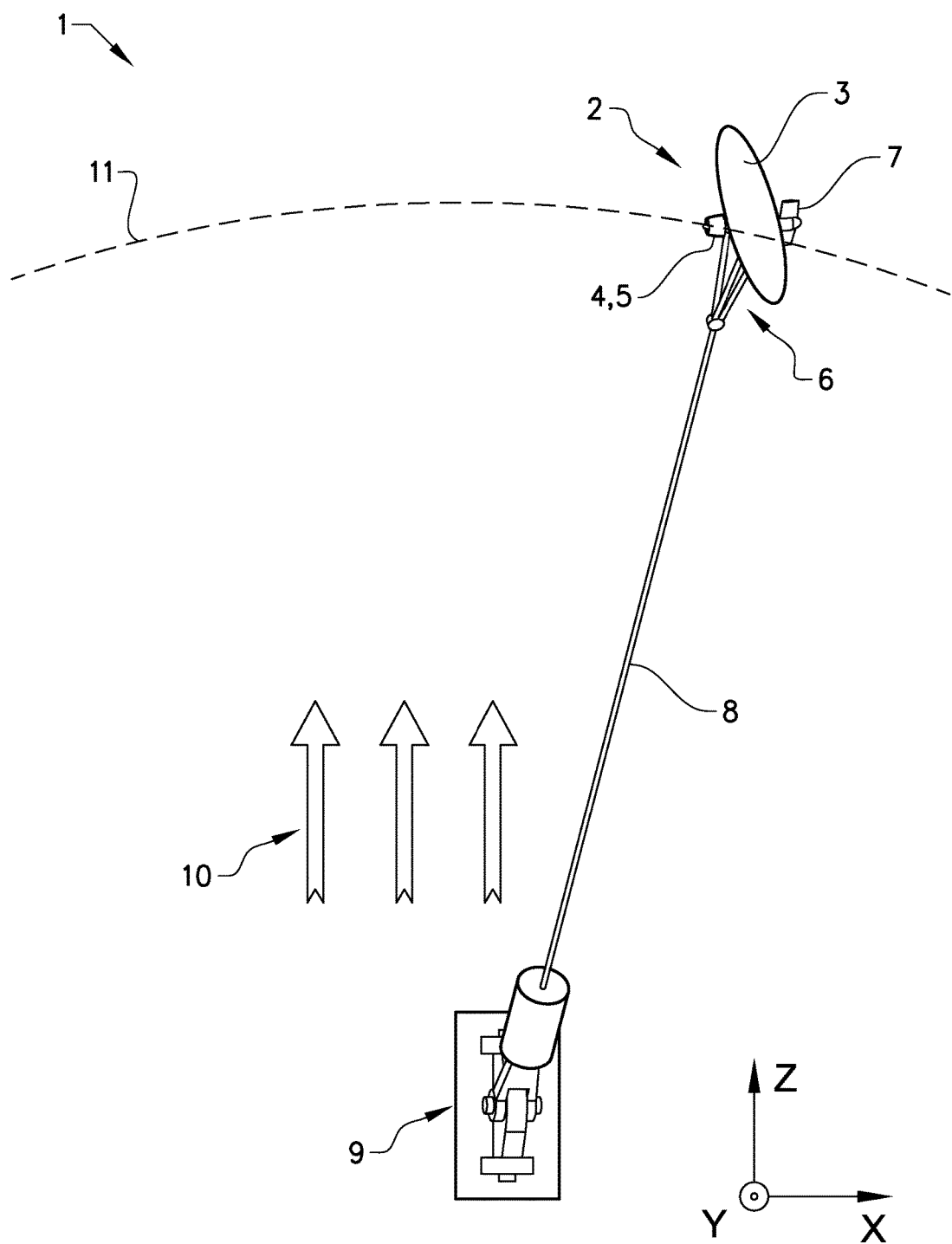
FIG. 1 shows an overview of a system according to the invention as viewed from above.

An overview of a system 1 according to the invention is shown in FIG. 1. The system 1 comprises a flying wing 2 where the flying wing 2 comprises a wing 3, a nacelle 4, a turbine 5 for producing electrical energy, struts 6 and at least one control surface 7. The system 1 further comprises a tether 8 attaching the flying wing 2 to a structure 9. The structure 9 can be positioned on a surface such as any ground surface or the bottom of a sea, lake or the ocean. The structure 9 may also be positioned on the surface of a sea, lake or ocean. The structure 9 is preferably fixed or secure in place. The flying wing system 1 and the method for controlling the flying wing 2 according to the invention can thus be used both on land and submerged under water. The flying wing 2 moves by that a fluid stream 10 moves over the wing 3 and creates lift. The fluid stream 10 can for instance be wind, a tidal stream or an underwater current. By using the control surface 7 the flying wing 2 can be made to move along a predetermined trajectory. The control surface 7 can for instance be a rudder as illustrated in FIG. 1. The control surface 7 may also be ailerons, elevators, spoilers or any combination of ailerons, elevators, spoilers and rudders.

The flying wing 2 further comprises sensors located on or inside the flying wing 2. The sensors from which the flying wing 2 receives input signals are a heading sensor, a pressure sensor, a yaw rate sensor and a speed sensor. The input signals are transmitted to a control system which comprises a computer-readable medium having computer executable instructions for performing the method according to the invention. The computer-readable medium may be in the form of an integrated circuit or non-volatile memories such as a hard disk drive, flash memory or ROM. The computer-readable medium forms part of the overall control system which may comprise additional parts. The method is implemented on the computer-readable medium using any suitable numeric methods.

In FIG. 1 it is schematically shown that the flying wing 2 as seen from above moves in a curved plane 11 with a radius equal to the distance from the flying wing 2 to the structure 9 to which the tether 8 is attached. The model can adjust for this movement which will be described in more detail below.

Figure 2:
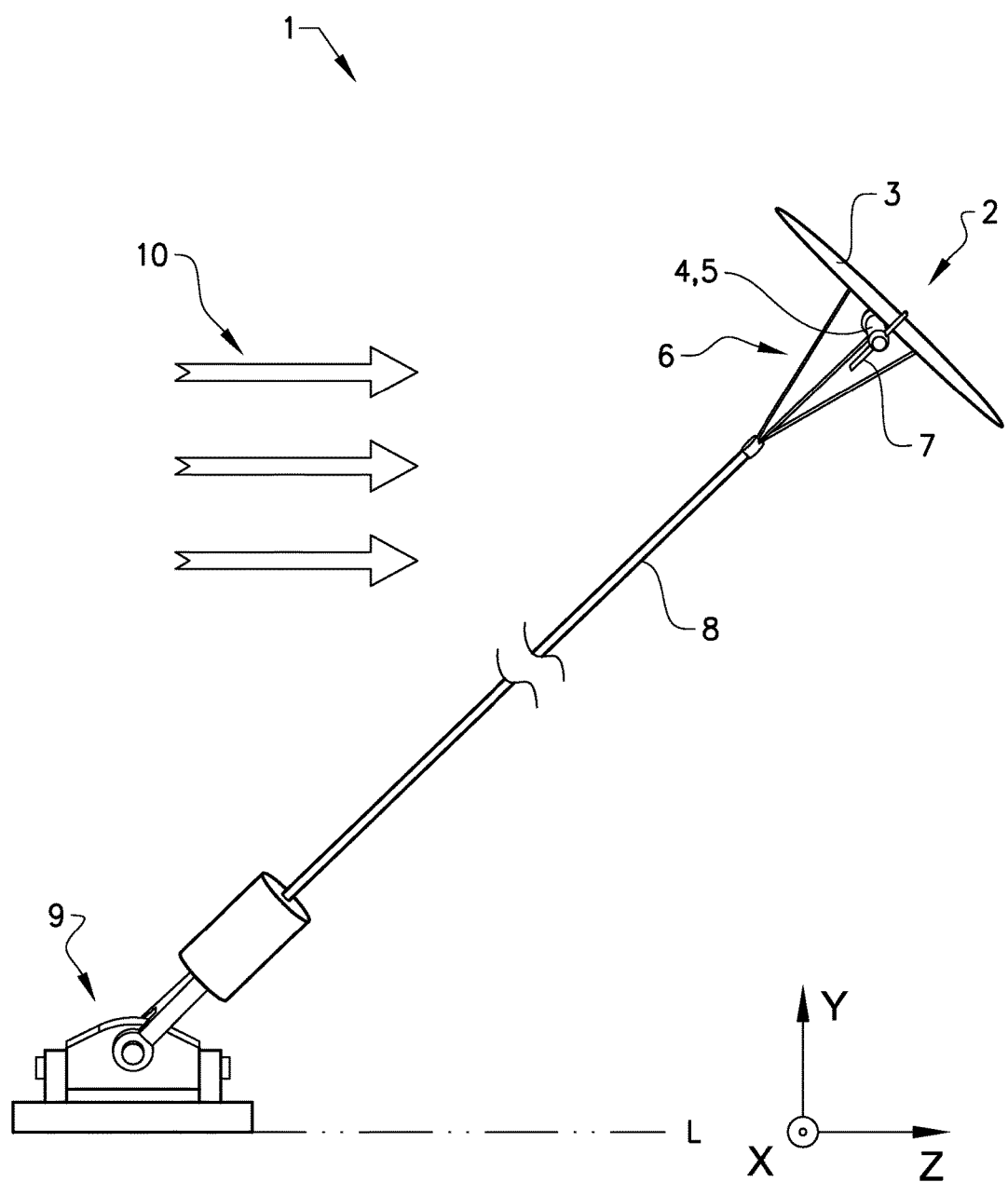
FIG. 2 shows an overview of a system according to the invention as viewed from the side.

FIG. 2 shows a system 1 according to the invention viewed from the side. From FIG. 2 the position of the structure 9 in relation to the level L over which the flying wing 2 moves can be seen. The level L at which the structure 9 is attached indicates the level over which the flying wing 2 moves and it is from that level that a vertical position of the flying wing 2 is measured and/or modelled. The level L can be placed on the bottom of the structure 9 or on another point as long as the position of the level L relative to the flying wing 2 can be easily measured. In case the structure 9 is located on the surface of a lake, sea or ocean, the level L at which the structure 9 is attached indicates the level L under which the flying wing 2 moves. The method according to the invention is adjusted accordingly.

Figure 3:
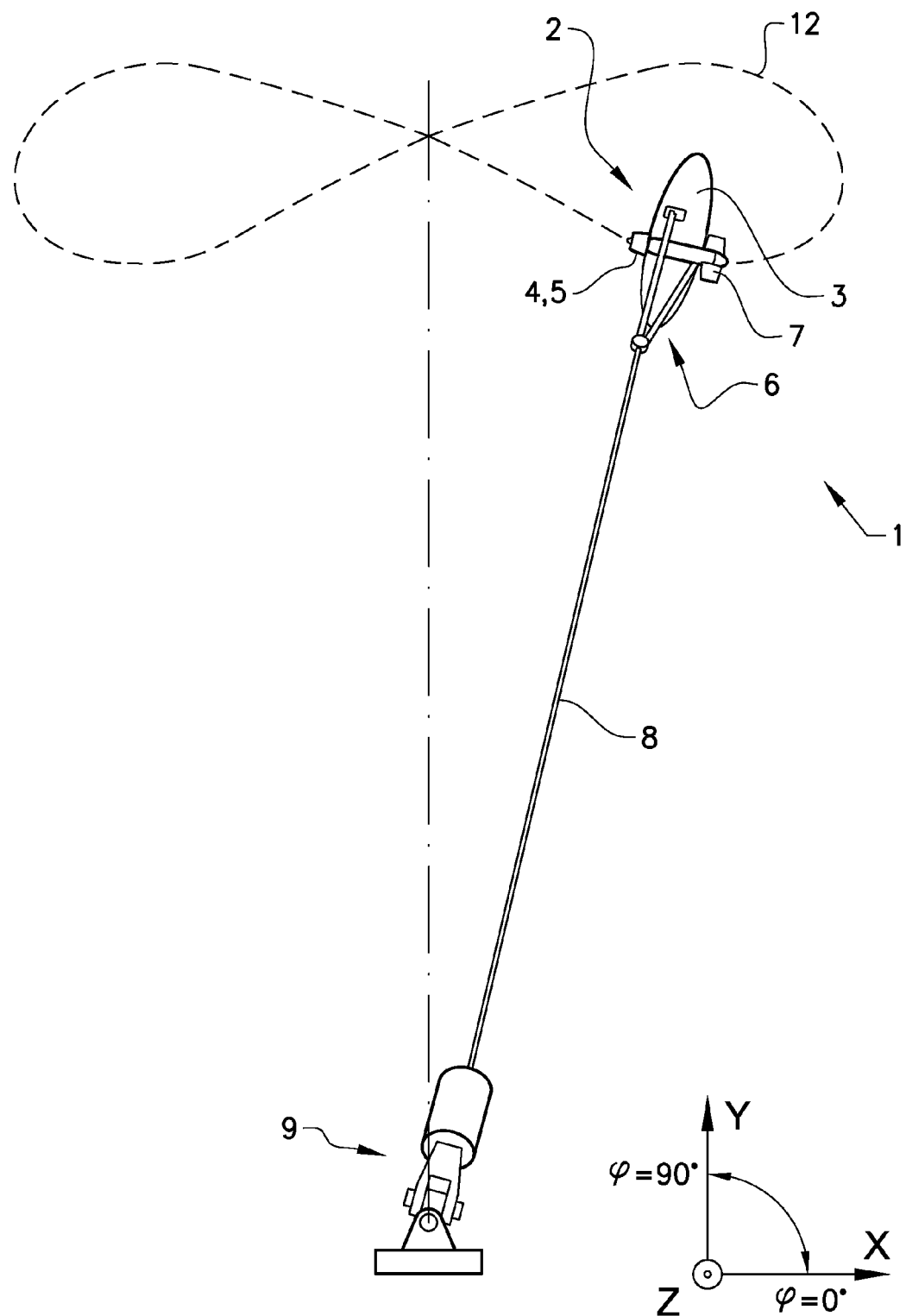
FIG. 3 shows an overview of a system according to the invention as viewed from the rear.

FIG. 3 shows a system 1 according to the invention viewed from the rear. In FIG. 3 the flying wing 2 can be seen to move along a predetermined trajectory 12 in the form of a figure-8 which is tilted 90°. The predetermined trajectory 12 may have different forms such as a circle, oval or any other predetermined trajectory which can be mirrored symmetrically along a vertical axis.

The structure 9 illustrated in FIGS. 1-3 is intended to be an example and is not to be considered to be limiting to the invention. Any other form of structure that allows for the same range of motion can be used with the invention.

From FIGS. 1-3 one reference frame for the flying wing 2 will be explained. From FIG. 4 another reference frame for the flying wing will be explained.

In FIGS. 1 and 2 a principal direction of the fluid stream 10 is directed in the direction of the arrows. In FIG. 3 the direction of the fluid stream 10 is into the figure. In FIGS. 1-3 x indicates the horizontal Cartesian position of the flying wing 2, y indicates the vertical Cartesian position of the flying wing 2 above a level L above which the flying wing 2 moves and z indicates a principal flow direction of the fluid stream 10, i.e. the wind direction or the direction of a tidal current or similar. A horizontal Cartesian position of x=0 means that the flying wing 2 is directed centrally along the principal flow direction z, i.e. substantially in the middle of the fluid stream 10. In the following description both measured and modelled values of x and y are Cartesian positions.

The flying wing 2 receives the following input values received from sensors located on or in the flying wing 2: heading $\phi$, pressure p used to obtain measured vertical Cartesian position y, yaw rate $\dot{\phi}$ and speed v. The heading $\phi$ is obtained from a heading sensor, the pressure p is obtained from a pressure sensor, the yaw rate $\dot{\phi}$ is obtained from a yaw rate sensor and the speed v is obtained from a speed sensor. Different gyroscopes can be used for measuring the yaw rate of the flying wing 2. The pressure sensor or sensors used measures a wing fluid pressure at a surface of the flying wing 2. The wing fluid pressure is used for calculating the vertical Cartesian position of the flying wing 2 over a level L above which the flying wing 2 moves. An accelerometer is used for measuring the heading of the flying wing 2. The speed is measured for instance by using the number of revolutions per second of a turbine 5 attached to the flying wing 2 or by a current meter. The speed may also be measured using pressure based sensors. The system 1 may further comprise an additional pressure sensor used to measure a level pressure of the level L over which the flying wing 2 moves. The additional pressure sensor may be located on the structure 9 or on the level L over which the flying wing 2 moves and may be used to increase the degree of accuracy of the calculation of the vertical position of the flying wing 2.

$\phi$ indicates the heading of the flying wing 2, i.e. the direction in which the front of the flying wing is pointing. $\phi=0°$ means that the flying wing 2 is directed directly upwards, $\phi=90°$ means that the flying wing 2 is directed directly to the left etc. This is indicated in the reference frame of FIG. 3.

Different reference frames can of course be used, for instance the z-axis indicating the direction of the fluid current may be positive in the opposite direction than the one shown in FIGS. 1-3. The same is possible for the x-axis and the y-axis correspondingly. The measure of the heading may be done clock-wise rather than counter-clockwise.

Figure 4:
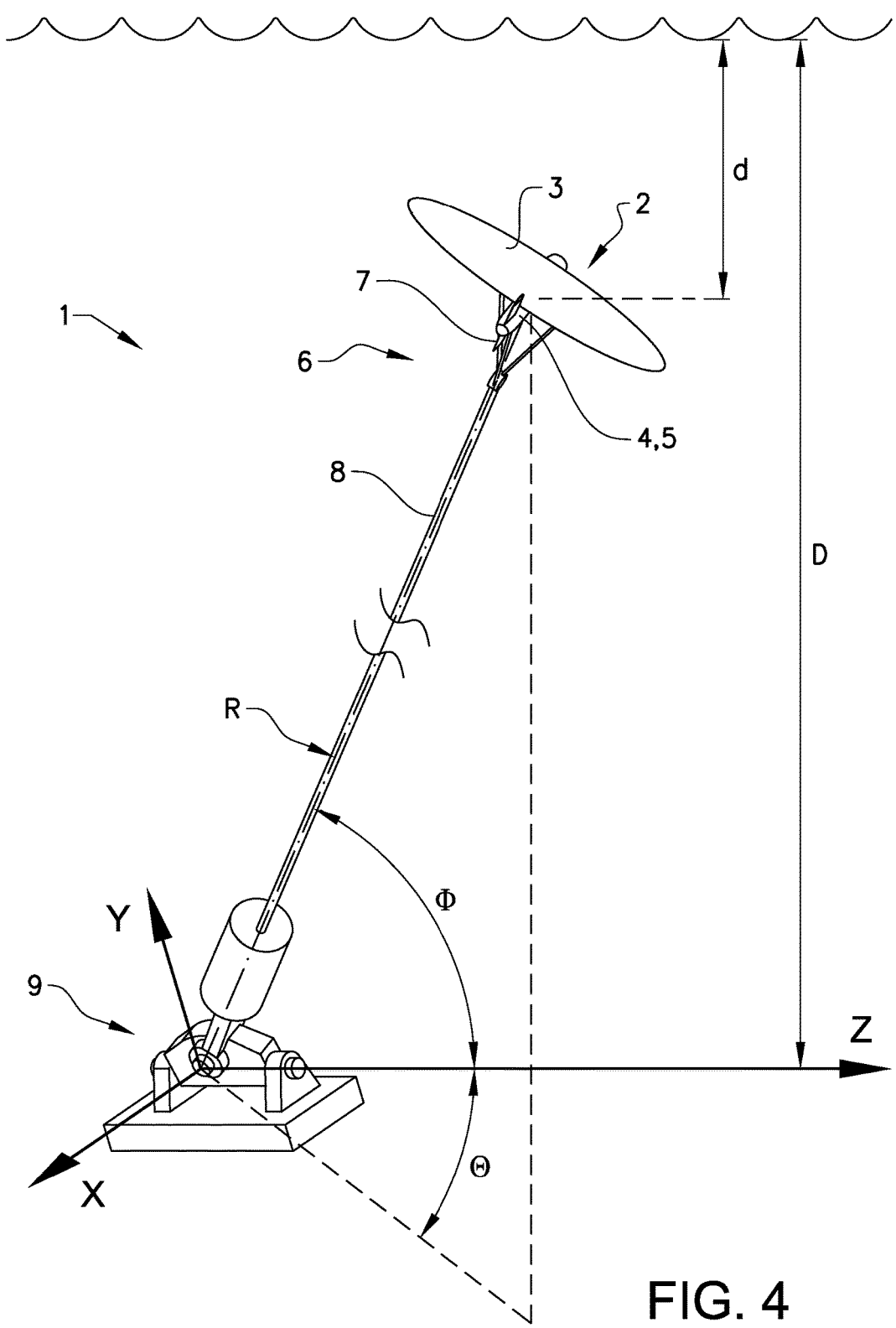
FIG. 4 shows a perspective view of a system according to the invention.

FIG. 4 schematically shows a perspective view of a system according to the invention. In FIG. 4 a second reference frame used in a second embodiment is shown. The remaining features are the same as in FIGS. 1-3. In FIG. 4, the vertical and horizontal position of the flying wing 2 is determined by using an azimuth angle Θ, also referred to as horizontal angle Θ, and an elevation angle Φ, also referred to as vertical angle Φ, and a length R of the tether 8. FIG. 4 further shows an installation depth D of the flying wing 2, i.e. the depth of the level L above which the flying wing 2 moves and a depth d of the flying wing 2 below a surface.

The flying wing system 1 and the method for controlling the flying wing 2 according to the invention can be used both on land and submerged under water.

Variables without subscript m indicate measured values, variables with subscript m indicates modelled values. A variable with the accent (dot) means the derivative of that variable with respect to time. For instance $\dot{\phi}$ means the derivate of $\phi$ with respect to time. A variable with the accent (double dot) means the second derivative of that variable with respect to time. For instance $\ddot{\phi}$ means the second derivate of $\phi$ with respect to time.

In the sensor feedback phase the flying wing 2 may be controlled using a modelled horizontal Cartesian position $x_m$, a measured vertical Cartesian position y obtained from pressure p, a measured heading $\phi$ and a measured yaw rate $\dot{\phi}$.

An initial heading $\phi_{intial}$ of the flying wing 2 is measured from a heading sensor located in the flying wing 2 at the start of the sensor feedback phase.

The heading $\phi$ is continuously calculated by integrating the yaw rate $\dot{\phi}$ from a yaw rate sensor.

$$\phi = \int \dot{\phi} dt \quad (1)$$

To compensate for errors in the heading $\phi$ the heading $\phi$ is iteratively adapted based on the measured vertical Cartesian position y (calculated from p) after a predetermined distance along the predetermined trajectory has been traversed by adding a term $\phi_{adaptation}$ to equation 1.

$$\phi = \int \dot{\phi} dt + \phi_{adaptation} \quad (2)$$

wherein $$\phi_{adaptation}(n_1) = \phi_{adaptation}(n_1-1) + k_1(\bar{y}_L - \bar{y}_R)$$

$$\phi_{adaptation}(0) = \phi_{initial}$$

where $\bar{y}_L$ is the average depth of the left side of the predetermined trajectory measured over the complete left side of the predetermined trajectory and where $\bar{y}_R$ is the average depth of the right side of the predetermined trajectory measured over the complete right side of the predetermined trajectory and $k_1$ is a tuning variable which is set to a value that allows for a suitable convergence of the adaptation towards a desired adaptation value. $n_1$ is the iteration step.

To compensate for errors in the yaw rate sensor the yaw rate $\dot{\phi}$ is iteratively adapted based on the measured vertical Cartesian position y after a predetermined distance along the predetermined trajectory has been traversed by adding a term $\dot{\phi}_{adaptation}$ to equation 2.

$$\phi = \int (\dot{\phi} + \dot{\phi}_{adaptation}) dt + \phi_{adaptation} \quad (3)$$

wherein $$\dot{\phi}_{adaptation}(n_2) = \dot{\phi}_{adaptation}(n_2 - 1) + \frac{k_2}{t}(\bar{y}_L - \bar{y}_R)$$

$$\dot{\phi}_{adaptation}(0) = 0$$

where $\bar{y}_L$ is the average depth of the left side of the predetermined trajectory measured over the complete left side of the predetermined trajectory and where $\bar{y}_R$ is the average depth of the right side of the predetermined trajectory measured over the complete right side of the predetermined trajectory, $k_2$ is a tuning variable which is set to a value that allows for a suitable convergence of the adaptation towards a desired adaptation value and t is the time to complete the predetermined distance along the predetermined trajectory. $n_2$ is the iteration step.

At the same time as the adaptation $\dot{\phi}_{adaptation}$ is calculated, a modelled adaptation of the yaw rate $\dot{\phi}_{m,adaptation}$ is calculated in order to prepare for the transition between the sensor feedback phase and the model feedback phase.

$$\dot{\phi}_{m,adaptation}(n_3) = \dot{\phi}_{m,adaptation}(n_3 - 1) + \frac{k_3}{t}(\Delta\bar{y} - \Delta\bar{y}_m)$$

$$\dot{\phi}_{m,adaptation}(0) = 0$$

The term $(\Delta\bar{y} - \Delta\bar{y}_m)$ is obtained by comparing a mean left vertical Cartesian position and a mean right vertical Cartesian position of the measured vertical Cartesian position ($\bar{y}_l$, $\bar{y}_r$) and the modelled vertical Cartesian position ($\bar{y}_{ml}$, $\bar{y}_{mr}$) to obtain a difference between the measured vertical Cartesian position and the modelled vertical Cartesian position, $$\Delta\bar{y} - \Delta\bar{y}_m = \left(\frac{\bar{y}_l - \bar{y}_r}{2}\right) - \left(\frac{\bar{y}_{ml} - \bar{y}_{mr}}{2}\right)$$

The modelled yaw rate is iteratively adapted based on the difference between the measured vertical Cartesian position and the modelled vertical Cartesian position $(\Delta\bar{y} - \Delta\bar{y}_m)$ after a predetermined distance along the predetermined trajectory has been traversed. $k_3$ is a tuning variable which is set to a value that allows for a suitable convergence of the adaptation towards a desired adaptation value and t is the time to complete the predetermined distance along the predetermined trajectory. $n_3$ is the iteration step. $\bar{y}_L$ and $\bar{y}_R$ may or may not be the same as $\bar{y}_l$ and $\bar{y}_r$ respectively depending on the predetermined distance along the predetermined trajectory traversed when measuring $\bar{y}_l$ and $\bar{y}_r$.

The flying wing's 2 modelled horizontal Cartesian position $x_m$ and modelled vertical Cartesian position $y_m$ are calculated by dead reckoning using the measured speed v and measured heading $\phi$ of the flying wing 2

$$x_m = \int \dot{x}_m dt, \dot{x}_m = v \cos\phi \quad (4)$$

$$y_m = \int \dot{y}_m dt, \dot{y}_m = v \sin\phi \cos\beta \quad (5)$$

where $\beta$ is the angle between the tether 8 of the flying wing 2 and the z-axis. The term $\cos\beta$ compensates for the fact that the flying wing 2 moves on a spherical surface. The addition of $\cos\beta$ compensates for that the surface of the sphere is curved in the vertical direction. It is also possible to correct for that the surface of the sphere is curved in the horizontal direction in a similar way. These corrections are not needed in the case the flying wing 2 is moving freely without being attached to a structure 9 with a tether 8. The modelled vertical Cartesian position $y_m$ is prepared for switching to the model feedback phase.

To compensate for that the flying wing 2 may drift away from a central position along the principal direction of the fluid stream 10 the modelled horizontal Cartesian position $x_m$ of the flying wing 2 is iteratively adapted by adding a term $x_{m,adaptation}$ to equation 4.

$$x_m = \int \dot{x}_m dt + x_{m,adaptation} \quad (6)$$

where $$x_{m,adaptation}(n_4) = x_{m,adaptation}(n_4 - 1) + k_4(\bar{v}_1 - \bar{v}_2)$$

$$x_{m,adaptation}(0) = 0$$

where $\bar{v}_1$ is the measured average speed of a first part of the predetermined trajectory and $\bar{v}_2$ is the measured average speed of a second part of the predetermined trajectory. $k_4$ is a tuning variable which is set to a value that allows for a suitable convergence of the adaptation towards a desired adaptation value. $n_4$ is the iteration step. The adaptation is based on that a first average speed $\bar{v}_1$ of a first part of the predetermined trajectory is equal to a second average speed $\bar{v}_2$ of a second part of the predetermined trajectory after a predetermined distance along the predetermined trajectory has been traversed. This keeps the flying wing 2 positioned in the principal direction of the fluid stream 10.

To further adapt the horizontal Cartesian position a horizontal drift speed adaptation $\dot{x}_{m,adaptation}$ is added to equation 6 such that the difference $\bar{v}_1 - \bar{v}_2 \to 0$.

$$x_m = \int (\dot{x}_m + \dot{x}_{m,adaptation}) dt + x_{m,adaptation} \quad (7)$$

where $$\dot{x}_{m,adaptation}(n_5) = \dot{x}_{m,adaptation}(n_5 - 1) + \frac{k_5}{t}(\bar{v}_1 - \bar{v}_2)$$

$$\dot{x}_{m,adaptation}(0) = 0$$

where $k_5$ is a tuning variable which is set to a value that allows for a suitable convergence of the adaptation towards a desired adaptation value and t is the time to complete the predetermined distance along the predetermined trajectory. $n_5$ is the iteration step.

To compensate for errors in the modelled vertical Cartesian position $y_m$, the modelled vertical Cartesian position $y_m$ is iteratively adapted based on the difference between the modelled vertical Cartesian position $y_m$ and the measured vertical Cartesian position y by adding a term $y_{m,adaptation}$ to equation 5.

$$y_m = \int \dot{y}_m dt = y_{m,adaptation} \quad (8)$$

where $$y_{m,adaptation}(n_6) = y_{m,adaptation}(n_6-1) + k_6(\bar{y} - \bar{y}_m)$$

$$y_{m,adaptation}(0) = 0$$

where $\bar{y}$ is the average measured vertical Cartesian position measured over an entire lap and $\bar{y}_m$ is the average modelled vertical Cartesian position calculated over an entire lap. $k_6$ is a tuning variable which is set to a value that allows for a suitable convergence of the adaptation towards a desired adaptation value. $n_6$ is the iteration step.

To further adapt the vertical Cartesian position a vertical drift speed adaptation $\dot{y}_{m,adaptation}$ is added to equation 8 such that the difference $\bar{y} - \bar{y}_m \rightarrow 0$.

$$y_m = \int (\dot{y}_m + \dot{y}_{m,adaptation}) dt + y_{m,adaptation} \quad (9)$$

where $$\dot{y}_{m,adaptation}(n_7) = \dot{y}_{m,adaptation}(n_7 - 1) + \frac{k_7}{t}(\bar{y} - \bar{y}_m)$$

$$\dot{y}_{m,adaptation}(0) = 0$$

where $k_7$ is a tuning variable which is set to a value that allows for a suitable convergence of the adaptation towards a desired adaptation value and t is the time to complete the predetermined distance along the predetermined trajectory. $n_7$ is the iteration step.

The control of the flying wing 2 in the sensor feedback phase thus may use the modelled horizontal Cartesian position $x_m$ obtained from equation 7, the measured vertical Cartesian position y (obtained from p), the measured heading $\phi$ and the measured yaw rate $\dot{\phi}$.

In the sensor feedback phase the flying wing 2 may alternatively be controlled using a modelled horizontal angle $\Theta_m$, a measured vertical angle $\Phi$ obtained from pressure p, a measured heading $\phi$ and a measured yaw rate $\dot{\phi}$. In this embodiment the horizontal position, both measured and modelled, is indicated as an angle instead of an absolute position. Similarly, the vertical position, both measured and modelled is indicated as an angle.

The measured vertical angle $\Phi$ is calculated from the height of the flying wing over the level L above which the flying wing 2 moves. A pressure sensor on the flying wing measures the depth of the flying wing below a surface. The height is then calculated from knowing an actual installation depth D of the flying wing 2, i.e. the depth of the level L above which the flying wing 2 moves, and the depth d of the flying wing 2 below a surface, i.e. the height is calculated from D−d, see FIG. 4. The installation depth D is either measured during installation or is measured by a level pressure sensor. The measured depth of the flying wing is thus calculated from $$\Phi = \arcsin\left(\frac{D-d}{R}\right)$$

An initial heading $\phi_{initial}$ of the flying wing 2 is measured from a heading sensor located in the flying wing 2 at the start of the sensor feedback phase.

The heading $\phi$ is continuously calculated by integrating the yaw rate $\dot{\phi}$ from a yaw rate sensor.

$$\phi = \int \dot{\phi} dt \quad (1''')$$

To compensate for errors in the heading $\phi$ the heading $\phi$ is iteratively adapted based on the measured vertical angle $\Phi$ (calculated from p) after a predetermined distance along the predetermined trajectory has been traversed by adding a term $\phi_{adaptation}$ to equation 1'.

$$\phi = \int \dot{\phi} dt + \phi_{adaptation} \quad (2')$$

wherein $$\phi_{adaptation}(n'_1) = \phi_{adaptation}(n'_1-1) + k'_1(\bar{\Phi}_L - \bar{\Phi}_R)$$

$$\phi_{adaptation}(0) = \phi_{initial}$$

where $\bar{\Phi}_L$ is the average vertical angle of the left side of the predetermined trajectory measured over the complete left side of the predetermined trajectory and where $\bar{\Phi}_R$ is the average vertical angle of the right side of the predetermined trajectory measured over the complete right side of the predetermined trajectory and $k'_1$ is a tuning variable which is set to a value that allows for a suitable convergence of the adaptation towards a desired adaptation value. $n'_1$ is the iteration step.

To compensate for errors in the yaw rate sensor the yaw rate $\dot{\phi}$ is iteratively adapted based on the measured vertical angle $\Phi$ after a predetermined distance along the predetermined trajectory has been traversed by adding a term $\dot{\phi}_{adaptation}$ to equation 2'.

$$\phi = \int (\dot{\phi} + \dot{\phi}_{adaptation}) dt + \phi_{adaptation} \quad (3')$$

wherein $$\dot{\phi}_{adaptation}(n'_2) = \dot{\phi}_{adaptation}(n'_2 - 1) + \frac{k'_2}{t}(\bar{\Phi}_L - \bar{\Phi}_R)$$

$$\dot{\phi}_{adaptation}(0) = 0$$

where $\bar{\Phi}_L$ is the average vertical angle of the left side of the predetermined trajectory measured over the complete left side of the predetermined trajectory and where $\bar{\Phi}_R$ is the average vertical angle of the right side of the predetermined trajectory measured over the complete right side of the predetermined trajectory, $k'_2$ is a tuning variable which is set to a value that allows for a suitable convergence of the adaptation towards a desired adaptation value and t is the time to complete the predetermined distance along the predetermined trajectory. $n'_2$ is the iteration step.

At the same time as the adaptation $\dot{\phi}_{adaptation}$ is calculated, a modelled adaptation of the yaw rate $\dot{\phi}_{m,adaptation}$ is calculated in order to prepare for the transition between the sensor feedback phase and the model feedback phase.

$$\dot{\phi}_{m,adaptation}(n'_3) = \dot{\phi}_{m,adaptation}(n'_3 - 1) + \frac{k'_3}{t}(\Delta\bar{\Phi} - \Delta\bar{\Phi}_m)$$

$$\dot{\phi}_{m,adaptation}(0) = 0$$

The term $(\Delta\bar{\Phi} - \Delta\bar{\Phi}_m)$ is obtained by comparing a mean left vertical angle and a mean right vertical angle of the measured vertical angle $(\bar{\Phi}_l, \bar{\Phi}_r)$ and the modelled vertical angle $(\bar{\Phi}_{ml}, \bar{\Phi}_{mr})$ to obtain a difference between the measured vertical angle and the modelled vertical angle, $$\Delta\Phi - \Delta\Phi_m = \left(\frac{\Phi_l - \Phi_r}{2}\right) - \left(\frac{\Phi_{ml} - \Phi_{mr}}{2}\right)$$

The modelled yaw rate is iteratively adapted based on the difference between the measured vertical angle and the modelled vertical angle ($\Delta\overline{\Phi}-\Delta\overline{\Phi}_m$) after a predetermined distance along the predetermined trajectory has been traversed. $k'_3$ is a tuning variable which is set to a value that allows for a suitable convergence of the adaptation towards a desired adaptation value and t is the time to complete the predetermined distance along the predetermined trajectory. $n'_3$ is the iteration step. $\overline{\Phi}_L$ and $\overline{\Phi}_R$ may or may not be the same as $\overline{\Phi}_l$ and $\overline{\Phi}_r$ respectively depending on the predetermined distance along the predetermined trajectory traversed when measuring $\overline{\Phi}_l$ and $\overline{\Phi}_r$.

The modelled horizontal angle $\Theta_m$, is calculated by taking an infinitesimal step dl in a horizontal direction along the predetermined trajectory over an infinitesimal time step dt.

$$dl = v\cos\varphi\, dt$$

$d\Theta_m$ can be calculated from $$\sin(d\Theta_m) = \frac{dl}{R}$$

$$d\Theta_m = \arcsin\frac{dl}{R} = \frac{dl}{R} + \left(\frac{1}{2}\right)\left(\frac{1}{3}\right)\left(\frac{dl}{R}\right)^3 + \left(\frac{1\cdot 3}{2\cdot 4}\right)\left(\frac{1}{5}\right)\left(\frac{dl}{R}\right)^5 + \ldots$$

As dl is small compared to R, $d\Theta_m$ can be approximated as $$d\Theta_m \approx \frac{dl}{R}$$

from which follows that $$\Theta_m = \int \frac{v\cos\varphi}{R} dt \qquad (4')$$

Similarly it follows that the vertical angle $\Phi$ is calculated by taking an infinitesimal vertical step dh along the predetermined trajectory over an infinitesimal time step dt.

$$dh = v\sin\varphi\, dt$$

$d\Phi_m$ can be calculated from $$\sin(d\Phi_m) = \frac{dh}{R}$$

$$d\Phi_m = \arcsin\frac{dh}{R} = \frac{dh}{R} + \left(\frac{1}{2}\right)\left(\frac{1}{3}\right)\left(\frac{dh}{R}\right)^3 + \left(\frac{1\cdot 3}{2\cdot 4}\right)\left(\frac{1}{5}\right)\left(\frac{dh}{R}\right)^5 + \ldots$$

As dh is small compared to R, $d\Phi_m$ can be approximated as $$d\Phi_m \approx \frac{dh}{R}$$

from which follows that $$\Phi_m = \int \frac{v\sin\varphi}{R} dt \qquad (5')$$

The modelled vertical angle $\Phi_m$ is prepared for switching to the model feedback phase.

To compensate for that the flying wing 2 may drift away from a central position along the principal direction of the fluid stream 10 the modelled horizontal angle $\Theta_m$ of the flying wing 2 is iteratively adapted by adding a term $\Theta_{m,adaptation}$ to equation 4.

$$\Theta_m = \int \dot{\Theta}_m dt + \Theta_{m,adaptation} \qquad (6')$$

where $$\Theta_{m,adaptation}(n'_4) = \Theta_{m,adaptation}(n'_4 - 1) + k'_4(\overline{v}_1 - \overline{v}_2)$$

$$\Theta_{m,adaptation}(0) = 0$$

where $\overline{v}_1$ is the measured average speed of a first part of the predetermined trajectory and $\overline{v}_2$ is the measured average speed of a second part of the predetermined trajectory. $k'_4$ is a tuning variable which is set to a value that allows for a suitable convergence of the adaptation towards a desired adaptation value. $n'_4$ is the iteration step. The adaptation is based on that a first average speed $\overline{v}_1$ of a first part of the predetermined trajectory is equal to a second average speed $\overline{v}_2$ of a second part of the predetermined trajectory after a predetermined distance along the predetermined trajectory has been traversed. This keeps the flying wing 2 positioned in the principal direction of the fluid stream 10.

To further adapt the horizontal position, a horizontal angular drift speed adaptation $\dot{\Theta}_{m,adaptation}$ is added to equation 6 such that the difference $\overline{v}_1 - \overline{v}_2 \to 0$.

$$\Theta_m = \int (\dot{\Theta}_m + \dot{\Theta}_{m,adaptation}) dt + \Theta_{m,adaptation} \qquad (7')$$

where $$\dot{\Theta}_{m,adaptation}(n'_5) = \dot{\Theta}_{m,adaptation}(n'_5 - 1) + \frac{k'_5}{t}(\overline{v}_1 - \overline{v}_2)$$

$$\dot{\Theta}_{m,adaptation}(0) = 0$$

where $k'_5$ is a tuning variable which is set to a value that allows for a suitable convergence of the adaptation towards a desired adaptation value and t is the time to complete the predetermined distance along the predetermined trajectory. $n'_5$ is the iteration step.

To compensate for errors in the modelled vertical angle $\Phi_m$, the modelled vertical angle $\Phi_m$ is iteratively adapted based on the difference between the modelled vertical angle $\Phi_m$ and the measured vertical angle $\Phi$ by adding a term $\Phi_{m,adaptation}$ to equation 5'.

$$\Phi_m = \int \dot{\Phi}_m dt + \Phi_{m,adaptation} \qquad (8')$$

where $$\Phi_{m,adaptation}(n'_6) = \Phi_{m,adaptation}(n'_6 - 1) + k'_6(\overline{\Phi} - \overline{\Phi}_m)$$

$$\Phi_{m,adaptation}(0) = 0$$

where $\overline{\Phi}$ is the average measured vertical angle measured over an entire lap and $\overline{\Phi}_m$ is the average modelled vertical angle calculated over an entire lap. $k'_6$ is a tuning variable which is set to a value that allows for a suitable convergence of the adaptation towards a desired adaptation value. $n'_6$ is the iteration step.

To further adapt the vertical angle a vertical angular drift speed adaptation $\dot{\Phi}_{m,adaptation}$ is added to equation 8 such that the difference $\Phi-\Phi_m \rightarrow 0$.

$$\Phi_m = \int (\dot{\Phi}_m + \dot{\Phi}_{m,adaptation}) dt + \Phi_{m,adaptation} \quad (9')$$

where $$\Phi_{m,adaptation}(n_7') = \Phi_{m,adaptation}(n_7' - 1) + \frac{k_7'}{t}(\Phi - \Phi_m)$$

$$\Phi_{m,adaptation}(0) = 0$$

where $k_7'$ is a tuning variable which is set to a value that allows for a suitable convergence of the adaptation towards a desired adaptation value and t is the time to complete the predetermined distance along the predetermined trajectory. $n_7'$ is the iteration step.

The control of the flying wing 2 in the sensor feedback phase may use the modelled horizontal angle $\Theta_m$ obtained from equation 7', the measured vertical angle $\Phi$ (obtained from p), the measured heading $\phi$ and the measured yaw rate $\dot{\phi}$.

In order to obtain the advantages mentioned above the flying wing 2 switches to a model feedback phase wherein modelled values of relevant parameters are used for control of the flying wing 2. The switching is done after a predetermined distance along the predetermined trajectory has been traversed and when a difference between a measured value of the vertical Cartesian position y and a modelled value of the vertical Cartesian position $y_m$ is below a threshold value h, i.e. when $y-y_m < h$. The predetermined distance can be at least 1 lap, specifically at least 10 laps, more specifically 20 laps. The threshold value h is between 0.5-5% of the length of the tether 8, specifically between 1-3% of the length of the tether 8 and more specifically 2% of the tether 8 length. If the threshold value h is smaller than 0.5% this could result in that the switching to the model feedback phase occurs to rarely or never takes place. If the difference between the measured value of the vertical Cartesian position y and a modelled value of the vertical Cartesian position $y_m$ is too great the adaptations may cause corrections resulting in unwanted behaviour of the flying wing. If the threshold value h is too great when switching this could result in that the flying wing 2 could end up below the level L over which the flying wing 2 is attached possibly leading to a crash or that the flying wing 2 can reach a vertical position over the level L which is above a secure height for the flying wing. If the flying wing is submerged the flying wing could reach the surface leading to damage to the flying wing. Thus, if the flying wing ends up outside defined vertical boundaries it may be damaged.

The above description of the switching between the sensor feedback phase and the model feedback phase applies also when measured vertical angle $\Phi$ and modelled vertical angle $\Phi_m$ are used as measured and modelled vertical position. Vertical angles $\Phi$ and $\Phi_m$ then typically replaces vertical Cartesian position y.

After switching to the model feedback phase the flying wing 2 may be controlled using a modelled horizontal Cartesian position $x_m$, a modelled vertical Cartesian position $y_m$, a modelled heading $\phi_m$ and a modelled yaw rate $\dot{\phi}_m$.

The modelled heading $\phi_m$ is continuously calculated by integrating the modelled yaw rate $\dot{\phi}_m$.

$$\phi_m = \int (\dot{\phi}_m + \dot{\phi}_{m,adaptation}) dt + \phi_{m,adaptation} \quad (10)$$

where $$\dot{\phi}_m = \int \ddot{\phi}_m dt \quad (11)$$

where $$\ddot{\phi}_m = -\frac{1}{\tau}\dot{\phi} + \frac{\kappa}{\tau} v\alpha,$$

where $\tau$ is a time constant, $\kappa$ is the turn gain, i.e. a gain related to the curvature of the spherical surface and $\alpha$ is the angle of for instance the rudder of the flying wing 2. The product $\kappa v\alpha$ yields a measure with the unit degrees/second.

The rudder controller controls a servo which sets the angle $\alpha$ of the rudder. The aim is to follow a predetermined trajectory placed on the surface of a sphere, where the structure 8 is in the sphere centre and the tether length R is the radius. Given the position of the flying wing 2, a target yaw rate is decided based on the error in position, error in heading angle, the kite speed and the current curvature of the predetermined trajectory. The target yaw rate is put into an internal model control (IMC) controller which calculates the target rudder angle a which is sent to the rudder servo.

The general IMC idea is to invert the yaw rate model. With no model errors a target yaw rate would result in a rudder target which would produce the desired target yaw rate. Model errors are compensated by feeding back the error (measured yaw rate-modelled yaw rate) and compensate the desired target yaw rate. Since the kite dynamic system contains servo delays, the controller also compensates this. The compensation level is a typical design parameter.

$\dot{\phi}_m$ is iteratively adapted based on the difference between the measured vertical average Cartesian position and the modelled vertical average Cartesian position ($\Delta\bar{y}-\Delta\bar{y}_m$) after a predetermined distance along the predetermined trajectory has been traversed.

$$\dot{\phi}_{m,adaptation}(n_8) = \dot{\phi}_{m,adaptation}(n_8-1) + k_8(\Delta\bar{y} - \Delta\bar{y}_m)$$

$$\dot{\phi}_{m,adaptation}(0) = 0$$

where $k_8$ is a tuning variable which is set to a value that allows for a suitable convergence of the adaptation towards a desired adaptation value and $n_8$ is the iteration number. The term ($\Delta\bar{y}-\Delta\bar{y}_m$) is obtained by comparing a mean left vertical Cartesian position and a mean right vertical Cartesian position of the measured vertical Cartesian position ($\bar{y}_l, \bar{y}_r$) and the modelled vertical Cartesian position ($\bar{y}_{ml}, \bar{y}_{mr}$) to obtain a difference between the measured vertical Cartesian position and the modelled vertical Cartesian position, $$\Delta\bar{y} - \Delta\bar{y}_m = \left(\frac{\bar{y}_l - \bar{y}_r}{2}\right) - \left(\frac{\bar{y}_{ml} - \bar{y}_{mr}}{2}\right)$$

The modelled yaw rate is iteratively adapted based on the difference between the measured vertical Cartesian position and the modelled vertical Cartesian position ($\Delta\bar{y}-\Delta\bar{y}_m$) after a predetermined distance along the predetermined trajectory has been traversed.

$$\dot{\phi}_{m,adaptation}(n_3) = \dot{\phi}_{m,adaptation}(n_3 - 1) + \frac{k_3}{t}(\Delta\bar{y} - \Delta\bar{y}_m)$$

$$\dot{\phi}_{m,adaptation}(0) = 0$$

This is thus the same adaptation used which was prepared during the sensor feedback phase. The iteration step $n_3$ may be reset upon switching to the model feedback phase.

The flying wing's 2 modelled horizontal Cartesian position $x_m$ and modelled vertical Cartesian position $y_m$ are calculated by dead reckoning using the measured speed $v$ and measured heading $\phi$ of the flying wing 2.

$$x_m = \int \dot{x}_m dt, \dot{x}_m = v \cos \phi \quad (12)$$

$$y_m = \int \dot{y}_m dt, \dot{y}_m = v \sin \phi \cos \beta \quad (13)$$

where $\beta$ is the angle between the tether 8 of the flying wing 2 and the z-axis. The term $\cos \beta$ compensates for the fact that the flying wing 2 moves on a spherical surface.

The addition of $\cos \beta$ compensates for that the surface of the sphere is curved in the vertical direction. It is also possible to correct for that the surface of the sphere is curved in the horizontal direction in a similar way. The modelled vertical Cartesian position $y_m$ which was prepared for switching to the model feedback phase is now used.

To compensate for that the flying wing 2 may drift away from a central position along the principal direction of the fluid stream 10 the modelled horizontal Cartesian position $x_m$ of the flying wing 2 is iteratively adapted by adding a term $x_{m,adaptation}$ to equation 12.

$$x_m = \int \dot{x}_m dt + x_{m,adaptation} \quad (14)$$

where $$x_{m,adaptation}(n_4) = x_{m,adaptation}(n_4-1) + k_4(\bar{v}_1 - \bar{v}_2)$$

$$x_{m,adaptation}(0) = 0$$

where $\bar{v}_1$ is the measured average speed of a first part of the predetermined trajectory and $\bar{v}_2$ is the measured average speed of a second part of the predetermined trajectory. $k_4$ is a tuning variable which is set to a value that allows for a suitable convergence of the adaptation towards a desired adaptation value. $n_4$ is the iteration step. The adaptation is based on that a first average speed $\bar{v}_1$ of a first part of the predetermined trajectory is equal to a second average speed $\bar{v}_2$ of a second part of the predetermined trajectory after a predetermined distance along the predetermined trajectory has been traversed. This keeps the flying wing 2 positioned in the principal direction of the fluid stream 10. This is the same adaptation as in the sensor feedback phase. The iteration step $n_4$ may be reset upon switching to the model feedback phase.

To further adapt the horizontal Cartesian position a horizontal drift speed adaptation $\dot{x}_{m,adaptation}$ is added to equation 14 such that the difference $\bar{v}_1 - \bar{v}_2 \rightarrow 0$.

$$x_m = \int (\dot{x}_m + \dot{x}_{m,adaptation}) dt + x_{m,adaptation} \quad (15)$$

where $$\dot{x}_{m,adaptation}(n_5) = \dot{x}_{m,adaptation}(n_5-1) + \frac{k_5}{t}(\bar{v}_1 - \bar{v}_2)$$

$$\dot{x}_{m,adaptation}(0) = 0$$

where $k_5$ is a tuning variable which is set to a value that allows for a suitable convergence of the adaptation towards a desired adaptation value and $t$ is the time to complete the predetermined distance along the predetermined trajectory. $n_5$ is the iteration step. This is the same adaptation as in the sensor feedback phase. The iteration step $n_5$ may be reset upon switching to the model feedback phase.

To compensate for errors in the modelled vertical Cartesian position $y_m$, the modelled vertical Cartesian position $y_m$ is iteratively adapted based on the difference between the modelled vertical Cartesian position $y_m$ and the measured vertical Cartesian position $y$ by adding a term $y_{m,adaptation}$ to equation 13.

$$y_m = \int \dot{y}_m dt + y_{m,adaptation} \quad (16)$$

where $$y_{m,adaptation}(n_6) = y_{m,adaptation}(n_6-1) + k_6(\bar{y} - \bar{y}_m)$$

$$y_{m,adaptation}(0) = 0$$

where $\bar{y}$ is the average measured vertical Cartesian position measured over an entire lap and $\bar{y}_m$ is the average modelled vertical Cartesian position calculated over an entire lap. $k_6$ is a tuning variable which is set to a value that allows for a suitable convergence of the adaptation towards a desired adaptation value. $n_6$ is the iteration step. This is the same adaptation as in the sensor feedback phase. The iteration step $n_6$ may be reset upon switching to the model feedback phase.

To further adapt the vertical Cartesian position a vertical drift speed adaptation $\dot{y}_{m,adaptation}$ is added to equation 16 such that the difference $\bar{y} - \bar{y}_m \rightarrow 0$.

$$y_m = \int (\dot{y}_m + \dot{y}_{m,adaptation}) dt + y_{m,adaptation} \quad (17)$$

where $$\dot{y}_{m,adaptation}(n_7) = \dot{y}_{m,adaptation}(n_7-1) + \frac{k_7}{t}(\bar{y} - \bar{y}_m)$$

$$\dot{y}_{m,adaptation}(0) = 0$$

where $k_7$ is a tuning variable which is set to a value that allows for a suitable convergence of the adaptation towards a desired adaptation value and $t$ is the time to complete the predetermined distance along the predetermined trajectory. $n_7$ is the iteration step. This is the same adaptation as in the sensor feedback phase. The iteration step $n_7$ may be reset upon switching to the model feedback phase.

The control of the flying wing 2 in the model feedback phase thus uses the modelled horizontal Cartesian position $x_m$ obtained from equation 15, the modelled vertical Cartesian position $y_m$ obtained from equation 17, the modelled heading $\phi$ obtained from equation 10 and the modelled yaw rate $\dot{\phi}$ obtained from equation 11.

After switching to the model feedback phase the flying wing 2 may alternatively be controlled using a modelled horizontal angle $\Theta_m$, a modelled vertical angle $\Phi_m$, a modelled heading $\phi_m$ and a modelled yaw rate $\dot{\phi}_m$. In this embodiment the horizontal position, both measured and modelled, is indicated as an angle instead of a Cartesian position. Similarly, the vertical position, both measured and modelled is indicated as an angle.

The modelled heading $\phi_m$ is continuously calculated by integrating the modelled yaw rate $\dot{\phi}_m$.

$$\phi_m = \int (\dot{\phi}_m + \dot{\phi}_{m,adaptation}) dt + \phi_{m,adaptation} \quad (10')$$

where $$\dot{\phi}_m = \int \ddot{\phi}_m dt \quad (11')$$

where $$\ddot{\phi}_m = -\frac{1}{\tau}\dot{\phi} + \frac{K}{\tau}v\alpha,$$

where τ is a time constant, κ is the turn gain, i.e. a gain related to the curvature of the spherical surface and α is the angle of the rudder of the flying wing 2. The product κνα yields a measure with the unit degrees/second.

$\phi_m$ is iteratively adapted based on the difference between the measured vertical average angle and the modelled vertical average angle ($\Delta\overline{\Phi}-\Delta\overline{\Phi}_m$) after a predetermined distance along the predetermined trajectory has been traversed.

$$\phi_{m,adaptation}(n'_8) = \phi_{m,adaptation}(n'_B-1) + k'_8(\Delta\overline{\Phi}-\Delta\overline{\Phi}_m)$$

$$\phi_{m,adaptation}(0) = 0$$

where $k'_8$ is a tuning variable which is set to a value that allows for a suitable convergence of the adaptation towards a desired adaptation value and $n'_8$ is the iteration number. The term ($\Delta\overline{\Phi}-\Delta\overline{\Phi}_m$) is obtained by comparing a mean left vertical angle and a mean right vertical angle of the measured vertical angle ($\overline{\Phi}_l$, $\overline{\Phi}_r$) and the modelled vertical angle ($\overline{\Phi}_{ml}$, $\overline{\Phi}_{mr}$) to obtain a difference between the measured vertical angle and the modelled vertical angle, $$\Delta\overline{\Phi} - \Delta\overline{\Phi}_m = \left(\frac{\overline{\Phi}_l - \overline{\Phi}_r}{2}\right) - \left(\frac{\overline{\Phi}_{ml} - \overline{\Phi}_{mr}}{2}\right)$$

The modelled yaw rate is iteratively adapted based on the difference between the measured vertical angle and the modelled vertical angle ($\Delta\overline{\Phi}-\Delta\overline{\Phi}_m$) after a predetermined distance along the predetermined trajectory has been traversed.

$$\dot{\varphi}_{m,adaptation}(n'_3) = \dot{\varphi}_{m,adaptation}(n'_3 - 1) + \frac{k'_3}{t}(\Delta\overline{\Phi} - \Delta\overline{\Phi}_m)$$

$$\dot{\varphi}_{m,adaptation}(0) = 0$$

This is thus the same adaptation used which was prepared during the sensor feedback phase. The iteration step $n'_3$ may be reset upon switching to the model feedback phase.

The modelled horizontal angle $\Theta_m$ is calculated by taking an infinitesimal step dl in a horizontal direction along the predetermined trajectory over an infinitesimal time step dt.

$$dl = v \cos\phi\, dt$$

$d\Theta_m$ can be calculated from $$\sin(d\Theta_m) = \frac{dl}{R}$$

$$d\Theta_m = \arcsin\frac{dl}{R} = \frac{dl}{R} + \left(\frac{1}{2}\right)\left(\frac{1}{3}\right)\left(\frac{dl}{R}\right)^3 + \left(\frac{1\cdot 3}{2\cdot 4}\right)\left(\frac{1}{5}\right)\left(\frac{dl}{R}\right)^5 + \ldots$$

As dl is small compared to R, $d\Theta_m$ can be approximated as $$d\Theta_m \approx \frac{dl}{R}$$

from which follows that $$\Theta_m = \int \frac{v\cos\varphi}{R}dt \quad (12')$$

Similarly it follows that the vertical angle Φ is calculated by taking an infinitesimal vertical step dh along the predetermined trajectory over an infinitesimal time step dt.

$$dh = v \sin\phi\, dt$$

$d\Phi_m$ can be calculated from $$\sin(d\Theta_m) = \frac{dh}{R}$$

$$d\Theta_m = \arcsin\frac{dh}{R} = \frac{dh}{R} + \left(\frac{1}{2}\right)\left(\frac{1}{3}\right)\left(\frac{dh}{R}\right)^3 + \left(\frac{1\cdot 3}{2\cdot 4}\right)\left(\frac{1}{5}\right)\left(\frac{dh}{R}\right)^5 + \ldots$$

As dh is small compared to R, $d\Phi_m$ can be approximated as $$d\Theta_m = \frac{dh}{R}$$

from which follows that $$\Phi_m = \int \frac{v\sin\varphi}{R}dt \quad (13')$$

The modelled vertical angle $\Phi_m$ which was prepared for switching to the model feedback phase is now used.

To compensate for that the flying wing 2 may drift away from a central position along the principal direction of the fluid stream 10 the modelled horizontal angle $\Theta_m$ of the flying wing 2 is iteratively adapted by adding a term $\Theta_{m,adaptation}$ to equation 12'.

$$\Theta_m = \int \dot{\Theta}_m dt + \Theta_{m,adaptation} \quad (14')$$

where $$\Theta_{m,adaptation}(n'_4) = \Theta_{m,adaptation}(n'_4-1) + k'_4(\overline{v}_1 - \overline{v}_2)$$

$$\Theta_{m,adaptation}(0) = 0$$

where $\overline{v}_1$ is the measured average speed of a first part of the predetermined trajectory and $\overline{v}_2$ is the measured average speed of a second part of the predetermined trajectory. $k'_4$ is a tuning variable which is set to a value that allows for a suitable convergence of the adaptation towards a desired adaptation value. $n'_4$ is the iteration step. The adaptation is based on that a first average speed $\overline{v}_1$ of a first part of the predetermined trajectory is equal to a second average speed $\overline{v}_2$ of a second part of the predetermined trajectory after a predetermined distance along the predetermined trajectory has been traversed. This keeps the flying wing 2 positioned in the principal direction of the fluid stream 10. This is the same adaptation as in the sensor feedback phase. The iteration step $n'_4$ may be reset upon switching to the model feedback phase.

To further adapt the horizontal angle a horizontal angular speed adaptation $\dot{\Theta}_{m,adaptation}$ is added to equation 14' such that the difference $\overline{v}_1 - \overline{v}_2 \to 0$.

$$\Theta_m = \int(\dot{\Theta}_m + \dot{\Theta}_{m,adaptation})dt + \Theta_{m,adaptation} \quad (15')$$

where $$\dot{\Theta}_{m,adaptation}(n'_5) = \dot{\Theta}_{m,adaptation}(n'_5 - 1) + \frac{k'_5}{t}(\overline{v}_1 - \overline{v}_2)$$

$$\dot{\Theta}_{m,adaptation}(0) = 0$$

where $k'_5$ is a tuning variable which is set to a value that allows for a suitable convergence of the adaptation towards a desired adaptation value and t is the time to complete the predetermined distance along the predetermined trajectory. $n'_5$ is the iteration step. This is the same adaptation as in the sensor feedback phase. The iteration step $n'_5$ may be reset upon switching to the model feedback phase.

To compensate for errors in the modelled vertical angle $\Phi_m$, the modelled vertical angle $\Phi_m$ is iteratively adapted based on the difference between the modelled vertical angle $\Phi_m$ and the measured vertical angle $\Phi$ by adding a term $\Phi_{m,adaptation}$ to equation 13.

$$\Phi_m = \int \dot{\Phi}_m dt + \Phi_{m,adaptation} \quad (16')$$

where $$\Phi_{m,adaptation}(n'_6) = \Phi_{m,adaptation}(n'_6 - 1) + k'_6(\overline{\Phi} - \overline{\Phi}_m)$$

$$\Phi_{m,adaptation}(0) = 0$$

where $\overline{\Phi}$ is the average measured vertical angle measured over an entire lap and $\overline{\Phi}_m$ is the average modelled vertical angle calculated over an entire lap. $k'_6$ is a tuning variable which is set to a value that allows for a suitable convergence of the adaptation towards a desired adaptation value. $n'_6$ is the iteration step. This is the same adaptation as in the sensor feedback phase. The iteration step $n'_6$ may be reset upon switching to the model feedback phase.

To further adapt the vertical angle a vertical angular speed adaptation $\dot{\Phi}_{m,adaptation}$ is added to equation 16 such that the difference $\overline{\Phi} - \overline{\Phi}_m \to 0$.

$$\Phi_m = \int (\dot{\Phi}_m + \dot{\Phi}m,.adaptation)dt + \Phi_{m,adaptation} \quad (17')$$

where $$\Phi_{m,adaptation}(n'_7) = \Phi_{m,adaptation}(n'_7 - 1) + \frac{k'_7}{t}(\overline{\Phi} - \overline{\Phi}_m)$$

$$\overline{\Phi}_{m,adaptation}(0) = 0$$

where $k'_7$ is a tuning variable which is set to a value that allows for a suitable convergence of the adaptation towards a desired adaptation value and t is the time to complete the predetermined distance along the predetermined trajectory. $n'_7$ is the iteration step. This is the same adaptation as in the sensor feedback phase. The iteration step $n'_7$ may be reset upon switching to the model feedback phase.

The control of the flying wing 2 in the model feedback phase thus uses the modelled horizontal angle $\Theta_m$ obtained from equation 15', the modelled vertical angle $\Phi_m$ obtained from equation 17', the modelled heading $\phi$ obtained from equation 10' and the modelled yaw rate $\dot{\phi}$ obtained from equation 11'.

The values of the tuning variables $k_1, k_2, k_3, k_4, k_5, k_6, k_7, k_8$ and $k'_1, k'_2, k'_3, k'_4, k'_5, k'_6, k'_7$ are obtained by testing to provide the system 1 with suitable convergences. $n_1, n_2, n_3, n_4, n_5, n_6, n_7, n_8$ and $n'_1, n'_2, n'_3, n'_4, n'_5, n'_6, n'_7$ are iteration parameters which may or may not be equal for all the adaptations. In cases where the iteration parameters are the same for the sensor feedback phase and the model feedback phase the iteration parameters may be reset when switching between the sensor feedback phase and the model feedback phase.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description are to be regarded as illustrative in nature, and not restrictive. For instance although the figures all describe a flying wing attached with a tether the flying wing can operate without being attached to a structure by a tether. Further, the calculations of $\Phi$ and $\Theta$ can easily be adapted for a flying wing according to the invention which is placed either submerged under water or above water. Above water the structure can be placed on the surface of a body of water or on land.

The installation depth D can be measured to other locations than is indicated in the figures. Likewise, the position of the coordinate systems can be adapted if necessary to other locations.

The invention claimed is:

1. A method for control of a flying wing, the flying wing being arranged to be controlled to move along a predetermined trajectory by means of a fluid stream passing the flying wing; the flying wing comprising a wing and at least one control surface for controlling a movement of the flying wing along the predetermined trajectory, the flying wing being positioned in a reference system where the x-axis is directed horizontally along a level L above which the flying wing moves, the y-axis is perpendicular to the x-axis in a vertical direction and the z-axis is perpendicular to the x-axis along the level L in a direction along the principal direction of the fluid stream, the flying wing being arranged to be attached to said level L by means of a tether attached to a structure positioned at said level L, wherein the control of the flying wing is arranged to be performed using a horizontal position of the flying wing, a vertical position of the flying wing, a heading of the flying wing and a yaw rate of the flying wing, where the horizontal position, the vertical position, the heading and the yaw rate can be measured or modelled, wherein the method uses as measured input values the heading, pressure to obtain measured vertical position, yaw rate and speed of the flying wing, wherein the method comprises:

controlling the movement of the flying wing along the predetermined trajectory during a sensor feedback phase using measured values of heading, vertical position and yaw rate and modelled values of horizontal position, switching between said sensor feedback phase and a model feedback phase after a predetermined distance along the predetermined trajectory has been traversed and when a deviation between the measured value of the vertical position and a modelled value of the vertical position is below a threshold value, and controlling the movement of the flying wing along the predetermined trajectory during said model feedback phase using modelled values of heading, vertical position, horizontal position and yaw rate.

2. The method of claim 1, wherein the sensor feedback phase of the method comprises:

continuously updating the heading by integrating the measured yaw rate, iteratively adapting the heading based on the measured vertical position after a predetermined distance along the predetermined trajectory has been traversed, iteratively adapting the yaw rate based on the measured vertical position after a predetermined distance along the predetermined trajectory has been traversed, calculating a modelled adaptation of the yaw rate in order to prepare for the transition between the sensor feedback phase and the model feedback phase, calculating the flying wing's modelled horizontal position and modelled vertical position by dead reckoning using the measured speed and measured heading of the flying wing, iteratively adapting the modelled horizontal position of the flying wing based on the average speed of a first part of the predetermined trajectory and the average speed of a second part of the predetermined trajectory, iteratively adapting a horizontal drift speed based on the average speed of a first part of the predetermined trajectory and the average speed of a second part of the predetermined trajectory, iteratively adapting the modelled vertical position based on the difference between the modelled vertical position and the measured vertical position, and iteratively adapting a vertical drift speed based on the difference between the modelled vertical position and the measured vertical position.

3. The method of claim 1, wherein the model feedback phase of the method comprises:

continuously calculating the modelled heading by integrating the modelled yaw rate, iteratively adapting the modelled heading based on the difference between the measured vertical average position and the modelled vertical average position after a predetermined distance along the predetermined trajectory has been traversed, iteratively adapting the modelled yaw rate based on the difference between the measured vertical position and the modelled vertical position after a predetermined distance along the predetermined trajectory has been traversed, calculating the flying wing's modelled horizontal position and modelled vertical position by dead reckoning using the measured speed and measured heading of the flying wing, iteratively adapting the modelled horizontal position of the flying wing based on the average speed of a first part of the predetermined trajectory and the average speed of a second part of the predetermined trajectory, iteratively adapting a horizontal drift speed based on the average speed of a first part of the predetermined trajectory and the average speed of a second part of the predetermined trajectory, iteratively adapting the modelled vertical position based on the difference between the modelled vertical position and the measured vertical position, and iteratively adapting a vertical drift speed based on the difference between the modelled vertical position and the measured vertical position.

4. The method of claim 1, wherein the vertical position and the horizontal position are Cartesian positions or the vertical position and the horizontal position are a vertical angle and a horizontal angle respectively.

5. The method of claim 1, wherein the heading is obtained from a heading sensor, the pressure is obtained from a pressure sensor, the yaw rate is obtained from a yaw rate sensor and the speed is obtained from a speed sensor.

6. The method of claim 1, wherein the flying wing comprises a turbine for generating electrical energy by the movement of the flying wing through fluid of the fluid stream and where the flying wing is submerged in the fluid.

7. A system comprising:

a flying wing comprising a wing and at least one control surface for controlling the movement of the flying wing along a predetermined trajectory, the flying wing being arranged to move along the predetermined trajectory by means of a fluid stream passing the wing, the flying wing being positioned in a reference system where the x-axis is directed horizontally along a level L above which the flying wing moves, the y-axis is perpendicular to the x-axis in a vertical direction and the z-axis is perpendicular to the x-axis along the level L in a direction along the principal direction of the fluid stream, wherein the system uses measured values of yaw rate, heading and vertical position and a modelled value of horizontal position during a sensor feedback phase of movement along the predetermined trajectory, and modelled values of yaw rate, vertical position, horizontal position and heading during a model feedback phase of movement along the predetermined trajectory for control of the flying wing, wherein the system uses as measured input values the heading, pressure to obtain measured vertical position, yaw rate and speed of the flying wing during the sensor feedback phase, and wherein said sensor feedback phase is switched to the model feedback phase after a predetermined distance along the predetermined trajectory has been traversed and when a deviation between the measured value of the vertical position and the modelled value of the vertical position is below a threshold value.

8. The system of claim 7, wherein the system further comprises a level pressure sensor located at the level L above which the flying wing moves for measuring the level pressure at said level L, the level pressure being used to improve the calculation of the vertical position of the flying wing over the level L to which it is attached.

9. The system of claim 7, wherein the flying wing is arranged to be attached to said level L by means of a tether attached to a structure positioned at said level L.

10. The system of claim 7, wherein the heading is obtained from a heading sensor, the pressure is obtained from a pressure sensor, the yaw rate is obtained from a yaw rate sensor and the speed is obtained from a speed sensor.

11. The system of claim 10, wherein the heading sensor is an accelerometer, the yaw rate sensor is a gyroscope, the pressure sensor measures a wing fluid pressure at a surface of the flying wing and the speed sensor is one of a turbine configured to provide information on revolution rate thereof, an electric current meter or a pressure based meter.

12. The system of claim 7, wherein the flying wing comprises a turbine for generating electrical energy by the movement of the flying wing through fluid of the fluid stream and where the flying wing is submerged in the fluid.

13. A non-transitory computer-readable medium for use with a flying wing having, said computer-readable medium having computer executable instructions stored therein for performing the method of claim 1.

* * * * *